(12) United States Patent
Park et al.

(10) Patent No.: US 9,657,140 B2
(45) Date of Patent: May 23, 2017

(54) POLYIMIDE AND FILM USING SAME

(71) Applicant: KOLON INDUSTRIES, INC., Gwacheon-si, Gyeonggi-do (KR)

(72) Inventors: Hyo Jun Park, Yongin-si (KR); Hak Gee Jung, Yongin-si (KR); Chang Sik Ha, Busan (KR); Pradip Kumar Tapaswi, Busan (KR); Young Sik Jeong, Ulsan (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 0 days.

(21) Appl. No.: 15/114,093

(22) PCT Filed: Jan. 26, 2015

(86) PCT No.: PCT/KR2015/000812
§ 371 (c)(1),
(2) Date: Jul. 26, 2016

(87) PCT Pub. No.: WO2015/111982
PCT Pub. Date: Jul. 30, 2015

(65) Prior Publication Data
US 2016/0369054 A1 Dec. 22, 2016

(30) Foreign Application Priority Data
Jan. 27, 2014 (KR) .................. 10-2014-0009483
May 15, 2014 (KR) .................. 10-2014-0058606

(51) Int. Cl.
C08G 73/10 (2006.01)
C08L 79/04 (2006.01)
C08J 5/18 (2006.01)
C08G 73/06 (2006.01)
C08L 79/08 (2006.01)
C09D 179/08 (2006.01)

(52) U.S. Cl.
CPC ..... *C08G 73/1067* (2013.01); *C08G 73/0633* (2013.01); *C08G 73/10* (2013.01); *C08G 73/1042* (2013.01); *C08G 73/1075* (2013.01); *C08G 73/1085* (2013.01); *C08J 5/18* (2013.01); *C08L 79/04* (2013.01); *C08L 79/08* (2013.01); *C08J 2379/08* (2013.01); *C09D 179/08* (2013.01)

(58) Field of Classification Search
CPC ... C09D 179/08; C08G 73/1085; C08L 79/08; C08L 79/04
See application file for complete search history.

(56) References Cited

FOREIGN PATENT DOCUMENTS

| JP | 2009-13165 | A | 1/2009 |
|---|---|---|---|
| JP | 2009-175684 | A | 8/2009 |
| JP | 2011-203703 | * | 10/2011 |
| JP | 2011-203703 | A | 10/2011 |

OTHER PUBLICATIONS

USPTO search report, Jan. 2017.*
Ron Hulst et al., "Asymmetric Synthesis of New Chiral Europium N,N'-Disuccinate Complexes: Shift Reagents for Aqueous Solutions and Application in the Enantiomeric Excess Determination of Amino Acids", J. Org. Chem., 1994, pp. 7453-7458, vol. 59, No. 24, American Chemical Society.
C.B. Pollard et al., "Derivatives of Piperazine. III. Reactions with Unsaturated Esters, Part 1", J. Am. Chem. Soc., Jan. 1935, pp. 199-200, vol. 57.
International Searching Authority, International Search Report for PCT/KR2015/000812 dated Apr. 16, 2015.

* cited by examiner

*Primary Examiner* — Gregory Listvoyb
(74) *Attorney, Agent, or Firm* — Sughrue Mion, PLLC

(57) ABSTRACT

This invention relates to a polyimide and a film using the same and, more particularly, to a polyimide, which can exhibit a low dielectric constant while retaining the superior properties thereof, and can thus be utilized as electronic materials such as protective materials or insulating materials for liquid crystal displays or semiconductors, and optical communication materials such as optical waveguide materials, and to a polyimide film including the same.

12 Claims, 1 Drawing Sheet

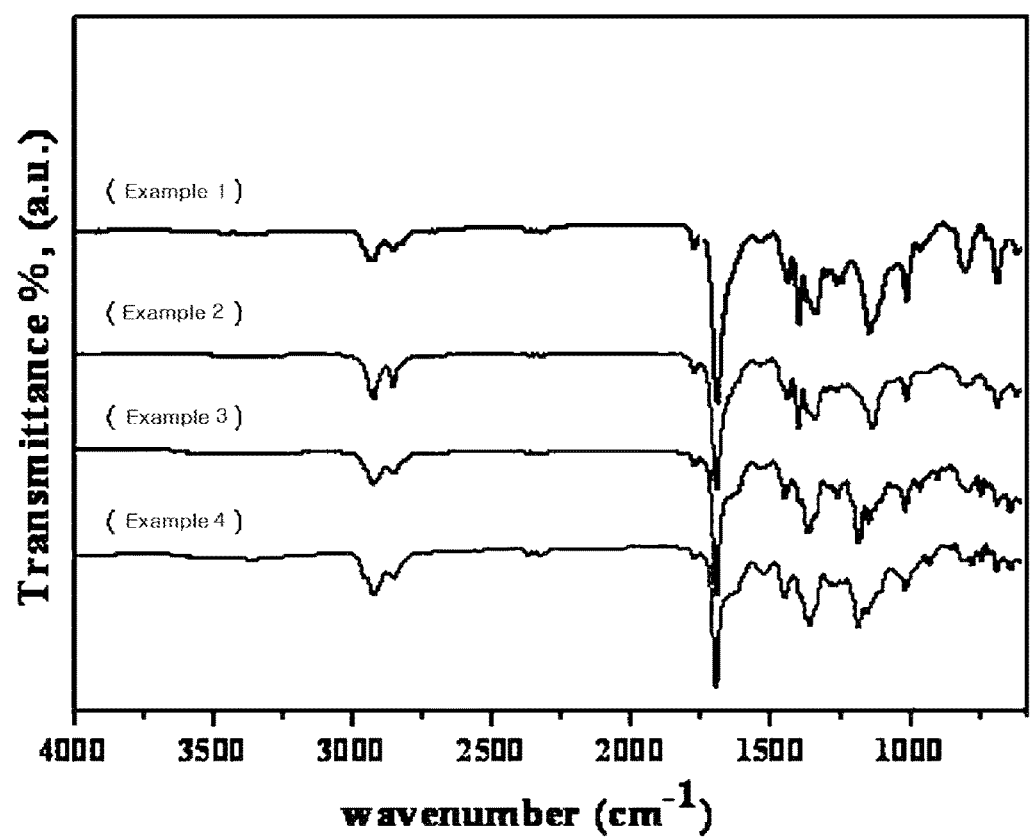

POLYIMIDE AND FILM USING SAME

CROSS REFERENCE TO RELATED APPLICATIONS

This application is a National Stage of International Application No. PCT/KR2015/000812 filed Jan. 26, 2015, claiming priority based on Korean Patent Application Nos. 10-2014-0009483 filed on Jan. 27, 2014 and 10-2014-0058606 filed on May 15, 2014, the contents of all of which are incorporated herein by reference in their entirety.

TECHNICAL FIELD

The present invention relates to a polyimide and a film using the same and, more particularly, to a polyimide, which exhibits high thermal stability, a low dielectric constant, and high light transmittance while retaining the superior properties of polyimide, and to a polyimide film including the same.

BACKGROUND ART

Typically, a polyimide has high mechanical strength, heat resistance, insulating properties, and solvent resistance, and thus is widely utilized as electronic materials, such as protective materials or insulating materials for liquid crystal displays, semiconductors, color filters, etc. Furthermore, the application thereof to optical communication materials such as optical waveguide materials or substrates for mobile phones is expected.

Recently, the development of the related field is astonishing, and the properties of materials suitable therefor must be continually improved. The demand for polyimide having various properties adapted for end uses, including transparency and the like as well as heat resistance and solvent resistance, is increasing.

A wholly aromatic polyimide, resulting from polycondensation of an aromatic tetracarboxylic dianhydride and an aromatic diamine, which are conventionally useful, shows a dark amber color, and becomes problematic in applications requiring high transparency. Also, since a wholly aromatic polyimide has a high dielectric constant, the use thereof as an electronic material requiring transparency and a low dielectric constant is limited.

In order to realize transparency, an alicyclic tetracarboxylic dianhydride and an aromatic diamine are subjected to polycondensation to give a polyimide precursor, which is then imidized, thereby obtaining a polyimide that is less colored and has high transparency (Japanese Examined Patent Publication No. Hei. 2-24294 and Japanese Unexamined Patent Publication No. Sho. 58-208322).

Also, a polyimide obtained using 1,2,3,4-cyclopentatetracarboxylic dianhydride (hereinafter, abbreviated to "CPDA") as a monomer is disclosed to serve as a gas barrier for an organic electroluminescent (hereinafter, abbreviated to "organic EL") device (Japanese Unexamined Patent Publication No. 2006-232960).

However, the polyimide thus obtained has a low degree of polymerization and has to be improved in heat resistance, and furthermore, the optical properties required thereof are not satisfactory.

DISCLOSURE

Technical Problem

Therefore, the present invention is intended to provide a polyimide, which may exhibit high thermal stability, a low dielectric constant, and high light transmittance while retaining the superior properties of polyimide, and a polyimide film including the same.

Technical Solution

An embodiment of the present invention provides a polyimide, obtained by polymerizing a diamine and an acid dianhydride to give polyamic acid that is then imidized, wherein the acid dianhydride includes a compound represented by Chemical Formula 1 below.

<Chemical Formula 1>

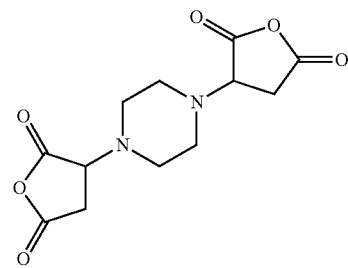

In a preferred embodiment of the present invention, the diamine may be at least one selected from the group consisting of an aromatic diamine selected from the group consisting of p-phenylenediamine, m-phenylenediamine, 2,5-diaminotoluene, 2,6-diaminotoluene, 1,3-bis(4,4'-aminophenoxy)benzene, 4,4'-diamino-1,5-phenoxypentane, 4,4'-diaminobiphenyl, 3,3'-dimethyl-4,4'-diaminobiphenyl, 3,3'-dimethoxy-4,4'-diaminobiphenyl, 4,4'-diaminodiphenylether, 4,4'-diaminodiphenylmethane, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2'-trifluoromethyl-4,4'-diaminobiphenyl, and mixtures thereof; an alicyclic diamine selected from the group consisting of 1,4-diaminocyclohexane, 1,4-cyclohexanebis(methylamine), 4,4'-diaminodicyclohexylmethane (MCA), 4,4'-methylenebis(2-methylcyclohexylamine) (MMCA), and mixtures thereof; and an aliphatic diamine selected from the group consisting of ethylene diamine (EN), 1,3-diaminopropane (13DAP), tetramethylene diamine, 1,6-hexamethylene diamine (16DAH), 1,12-diaminododecane (112DAD), and mixtures thereof.

In a preferred embodiment of the present invention, the diamine may be at least one selected from the group consisting of 1,6-hexamethylene diamine (16DAH), 1,12-diaminododecane (112DAD), 4,4'-diaminodicyclohexylmethane (MCA), and 4,4'-methylenebis(2-methylcyclohexylamine) (MMCA).

In a preferred embodiment of the present invention, the acid dianhydride may further include at least one selected from the group consisting of 2,2-bis(3,4-dicarboxyphenyl) hexafluoropropane dianhydride (6FDA), 4-(2,5-dioxotetrahydrofuran-3-yl)-1,2,3,4-tetrahydronaphthalene-1,2-dicarboxylic dianhydride (TDA), pyromellitic dianhydride (1,2,4,5-benzene tetracarboxylic dianhydride, PMDA), benzophenone tetracarboxylic dianhydride (BTDA), biphenyl tetracarboxylic dianhydride (BPDA), oxydiphthalic dianhydride (ODPA), biscarboxyphenyl dimethyl silane dianhydride (SiDA), bisdicarboxyphenoxy diphenyl sulfide dianhydride (BDSDA), sulfonyl diphthalic anhydride (SO₂DPA), cyclobutane tetracarboxylic dianhydride (CBDA), isopropylidenediphenoxy bisphthalic anhydride (6HBDA), bicyclo[2.2.2]-7-octene-2,3,5,6-tetracarboxylic dianhydride (BTA), cyclopentane tetracarboxylic dianhydride (CPDA), cyclohexane tetracarboxylic dianhydride (CHDA), and bicyclohexane tetracarboxylic dianhydride (HBPDA).

Another embodiment of the present invention provides a polyimide film including the above polyimide.

In a preferred embodiment of the present invention, the polyimide film may have a transmittance of 80% or more at 550 nm for a film thickness of 10 to 100 μm, and a dielectric constant of 3.3 or less at 1 GHz.

Advantageous Effects

According to the present invention, a polyimide can exhibit a low dielectric constant while retaining the superior properties thereof, and can thus be used as electronic materials such as protective materials or insulating materials for liquid crystal displays or semiconductors, as well as optical communication materials such as optical waveguide materials, and a polyimide film including the same can be provided.

BRIEF DESCRIPTION OF DRAWING

FIG. 1 is an FTIR spectrum graph of the polyimide films of Examples 1 to 4.

BEST MODE

Unless otherwise defined, all the technical and scientific terms used herein have the same meanings as those typically understood by those skilled in the art to which the present invention belongs. Generally, the nomenclature used herein is well known in the art and is typical.

As used herein, when any part "includes" any element, this means that another element is not excluded, but may be further included unless otherwise specifically mentioned.

The present invention pertains to a polyimide obtained by polymerizing a diamine and an acid dianhydride to give polyamic acid that is then imidized, wherein the acid dianhydride includes a compound represented by Chemical Formula 1 below, and to a polyimide film including the above polyimide.

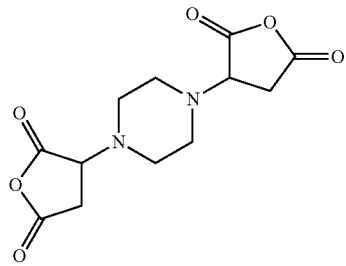

<Chemical Formula 1>

Generally, an aliphatic polyimide is receiving attention as an interlayer insulating material and optoelectronics because it has high solubility in an organic solvent, high transparency and a low dielectric constant due to low intramolecular density, polarity and intermolecular or intramolecular charge mobility thereof, compared to an aromatic polyimide.

Hence, in order to produce an aliphatic polyimide having high transparency and a low dielectric constant according to the present invention, nitrogen-containing piperazine-disuccinic anhydride (an acid dianhydride represented by Chemical Formula 1) was used as the acid dianhydride.

The acid dianhydride represented by Chemical Formula 1 according to the present invention contains at least one nitrogen atom in the molecule thereof, whereby the interactions of intramolecular or intermolecular chains may occur due to the lone electron pair of the nitrogen atom, ultimately greatly increasing the solubility and electrical properties of polyimide while retaining the superior inherent properties of polyimide.

According to the present invention, the acid dianhydride may be prepared via a very simple organic synthesis process, such as Michael addition and hydrolysis.

Specifically, the method of preparing the acid dianhydride according to the present invention includes reacting a compound represented by Chemical Formula 2 below with piperazine to give a compound represented by Chemical Formula 3 below, and hydrolyzing the compound represented by Chemical Formula 3 in the presence of a base catalyst to give a compound represented by Chemical Formula 4 below, which is then added with a dehydrating agent, yielding an acid dianhydride represented by Chemical Formula 1 below.

The method of preparing the acid dianhydride according to the present invention is summarized in Scheme 1 below.

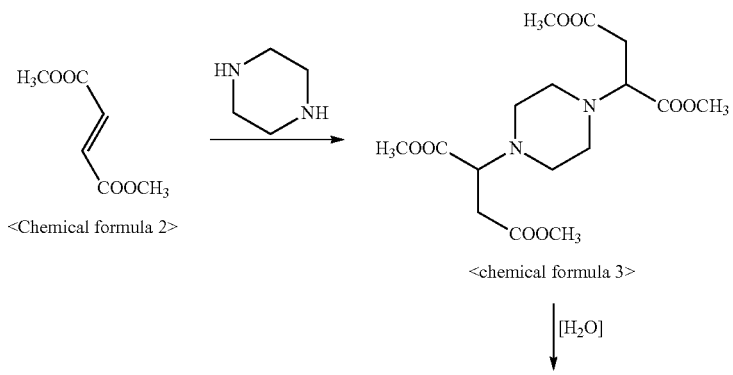

[Scheme 1]

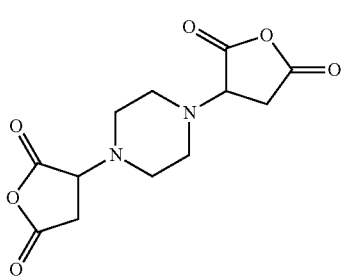

<chemical formula 1>

⇌ dehydrating agent

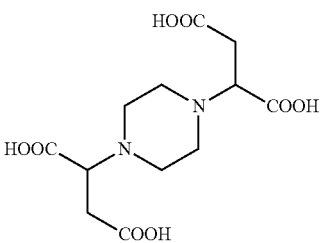

<chemical formula 4>

As represented in Scheme 1, the compound represented by Chemical Formula 3 is produced by the Michael addition of the compound (dimethyl fumarate) represented by Chemical Formula 2 and piperazine. In this Michael addition, the compound (dimethyl fumarate) represented by Chemical Formula 2 acts as a Michael acceptor and piperazine acts as a Michael donor.

The Michael addition is preferably carried out at 20 to 140° C. for 4 to 16 hr in order to attain the desired reaction efficiency.

The compound represented by Chemical Formula 2 and piperazine are used at a molar ratio of 1:0.45 to 1:0.55, whereby the compound represented by Chemical Formula 3 is preferably prepared in a desired yield.

As such, the compound represented by Chemical Formula 2 may be produced via a variety of known methods, and is preferably obtained by adding fumaric acid to methanol, followed by refluxing in the presence of an acid catalyst such as sulfuric acid and neutralization using a neutralizing agent such as sodium carbonate.

In the reaction mechanism according to the present invention, the reaction substrate itself is preferably used as a solvent, but another reaction solvent may be used. The reaction solvent is not particularly limited, so long as it does not impede the reaction, and examples thereof may include 1,4-dioxane, toluene, NMP (N-Methyl-2-pyrrolidone), DMAc (dimethylacetamide) and the like.

The compound represented by Chemical Formula 3 is hydrolyzed in the presence of a base catalyst, thus producing the compound represented by Chemical Formula 4. When the hydrolysis is carried out at 40 to 120° C. for 1 to 6 hr, the reaction may occur sufficiently, and thus the amount of unreacted material may be decreased and the evaporation of solvent and catalyst may be prevented, and furthermore, the cost and reaction efficiency become preferable.

The base catalyst used for the hydrolysis may be at least one selected from the group consisting of potassium hydroxide, sodium hydroxide, barium hydroxide, calcium hydroxide, aluminum hydroxide, and magnesium hydroxide, and preferably useful is potassium hydroxide or sodium hydroxide in terms of price and ease of handling.

The amount of the base catalyst falls in the range of 5 to 10 mol relative to 1 mol of the compound represented by Chemical Formula 3. Given the above range, the hydrolysis efficiency and the amount of hydrochloric acid that is precipitated due to the use of an appropriate amount of base catalyst become suitable, thus ensuring favorable reaction efficiency and productivity.

The aliphatic acid dianhydride represented by Chemical Formula 1 is prepared by adding the compound represented by Chemical Formula 4 with a dehydrating agent and carrying out a dehydration ring-closure reaction. As such, the dehydration ring-closure reaction is carried out at 40 to 100° C. for 4 to 28 hr to prevent evaporation of the catalyst and the solvent so as to increase the yield and to induce a sufficient reaction for an appropriate reaction time so as to achieve high yield.

The dehydrating agent may be at least one selected from the group consisting of acetic anhydride, and tertiary amines such as pyridine, isoquinoline, and triethylamine, the use of acetic anhydride and/or pyridine being preferable in terms of efficiency.

Also, the amount of the dehydrating agent falls in the range of 2 mol or more, and preferably 2 to 10 mol, relative to 1 mol of the compound represented by Chemical Formula 4. Given the above range, the reaction may be sufficiently induced, thus increasing the yield and achieving a favorable cost effect.

After the above reaction, the produced compound is filtered via a typical process and dried, yielding the acid dianhydride represented by Chemical Formula 1.

The acid dianhydride represented by Chemical Formula 1 according to the present invention is subjected to polycondensation with a diamine to give polyamic acid, which is then subjected to a dehydration ring-closure reaction using heat or a catalyst, thus yielding a polyimide. The equivalent ratio of the diamine to the acid dianhydride is preferably 1:1.

The diamine is not particularly limited, and any diamine used for conventional polyimide synthesis may be used. Specific examples thereof may include an aromatic diamine, such as p-phenylenediamine, m-phenylenediamine, 2,5-diaminotoluene, 2,6-diaminotoluene, 1,3-bis(4,4'-aminophenoxy)benzene, 4,4'-diamino-1,5-phenoxypentane, 4,4'-diaminobiphenyl, 3,3'-dimethyl-4,4'-diaminobiphenyl, 3,3'-dimethoxy-4,4'-diaminobiphenyl, 4,4'-diaminodiphenylether, 4,4'-diaminodiphenylmethane, 2,2'-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, and 2,2'-trifluoromethyl-4,4'-diaminobiphenyl; an alicyclic diamine, such as 1,4-diaminocyclohexane, 1,4-cyclohexanebis(methylamine), 4,4'-diaminodicyclohexylmethane (MCA), and 4,4'-methylene bis(2-methyl cyclohexylamine) (MMCA); and an aliphatic diamine, such as ethylene diamine (EN), 1,3-diaminopropane (13DAP), tetramethylene diamine, 1,6-hexamethylene diamine (16DAH), and 1,12-diaminododecane (112DAD). These diamines may be used alone or in combinations of two or more.

In particular, in terms of optical properties and electrical properties, the diamine of the present invention may be at least one selected from the group consisting of 1,6-hexamethylene diamine (which may also be referred to as 1,6-diaminohexane, 16DAH), 1,12-diaminododecane (112DAD), 4,4'-diaminodicyclohexylmethane (which may also be referred to as 4,4'-methylene bis(cyclohexylamine), MCA), and 4,4'-methylene bis(2-methyl cyclohexylamine) (MMCA).

The present invention may further include, in addition to the acid dianhydride represented by Chemical Formula 1, at least one acid dianhydride within a range that does not deteriorate the properties of polyimide, selected from the group consisting of 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic dianhydride (TDA), pyromellitic dianhydride (1,2,4,5-benzene tetracarboxylic dianhydride, PMDA), benzophenone tetracarboxylic dianhydride (BTDA), biphenyl tetracarboxylic dianhydride (BPDA), oxydiphthalic dianhydride (ODPA), biscarboxyphenyl dimethyl silane dianhydride (SiDA), bisdicarboxyphenoxy diphenyl sulfide dianhydride (BDSDA), sulfonyl diphthalic anhydride ($SO_2DPA$), cyclobutane tetracarboxylic dianhydride (CBDA), isopropylidenediphenoxy bisphthalic anhydride (6HBDA), bicyclo[2.2.2]-7-octene-2,3,5,6-tetracarboxylic dianhydride (BTA), cyclopentane tetracarboxylic dianhydride (CPDA), cyclohexane tetracarboxylic dianhydride (CHDA), and bicyclohexane tetracarboxylic dianhydride (HBPDA).

In particular, in order to improve optical properties and to ensure a low dielectric constant, the present invention may include a fluorinated acid dianhydride capable of increasing a free volume, such as 2,2-bis(3,4-dicarboxyphenyl)hexafluoropropane dianhydride (6FDA), and an aliphatic or cycloaliphatic acid dianhydride capable of decreasing intramolecular polarization anisotropy, such as 4-(2,5-dioxotetrahydrofuran-3-yl)-1,2,3,4-tetrahydronaphthalene-1,2-dicarboxylic dianhydride (TDA), cyclobutane tetracarboxylic dianhydride (CBDA), cyclopentane tetracarboxylic dianhydride (CPDA), bicyclo[2.2.2]-7-octene-2,3,5,6-tetracarboxylic dianhydride (BTA), cyclohexane tetracarboxylic dianhydride (CHDA), and bicyclohexane tetracarboxylic dianhydride (HBPDA), and the aforementioned aromatic acid dianhydride, such as pyromellitic dianhydride (1,2,4,5-benzene tetracarboxylic dianhydride, PMDA), benzophenone tetracarboxylic dianhydride (BTDA), or biphenyl tetracarboxylic dianhydride (BPDA) may be used within a range that does not deteriorate the optical properties of interest.

The amount of the acid dianhydride that is additionally contained is 80 mol % or less, and preferably 10 to 50 mol % based on the total molar amount of the acid dianhydride, whereby an increase in heat resistance within a range that does not deteriorate the optical properties or dielectric constant can be expected.

In the present invention, the method of obtaining polyamic acid is not particularly limited, so long as the acid dianhydride represented by Chemical Formula 1 and the diamine are reacted and polymerized via known preparation methods, and the method of mixing the acid dianhydride represented by Chemical Formula 1 with the diamine in the organic solvent and allowing the mixture to react is simply applied.

Specific examples of the organic solvent may include m-cresol, N-methyl-2-pyrrolidone (NMP), N,N-dimethylformamide (DMF), N,N-dimethylacetamide (DMAc), N-methylcaprolactame, dimethylsulfoxide (DMSO), tetramethyl urea, pyridine, dimethylsulfone, hexamethylphosphoramide, and γ-butyrolactone. These solvents may be used alone or in combinations of two or more. Also, even a solvent that does not dissolve polyamic acid may be added to the above solvent within a range within which a homogeneous solution is obtained.

The reaction temperature for solution polymerization is −20 to 150° C., and preferably −5 to 100° C. The molecular weight of polyamic acid may be controlled by changing the molar ratio of the acid dianhydride represented by Chemical Formula 1 and the diamine in the reaction, and as the above molar ratio approaches 1, the molecular weight of the resulting polyamic acid becomes large, as in typical polycondensation.

The dehydration ring-closure reaction of polyamic acid to obtain polyimide from polyamic acid is not particularly limited. Like a typical polyamic acid, ring-closure using heating or a chemical ring-closure process using a known dehydration ring-closure catalyst may be applied. The process using heating may stepwise increase the temperature from 80° C. to 300° C.

A chemical ring-closure process may be performed using an organic base such as pyridine or triethylamine in the presence of acetic anhydride. This processing temperature may fall in the range of −20 to 200° C. In this reaction, the polymerization solution of polyamic acid may be used without change, or may be diluted. Also, polyamic acid may be recovered from the polymerization solution of polyamic acid, and may then be dissolved in an appropriate organic solvent before use. The organic solvent may be exemplified by the aforementioned solvent used for the polymerization of polyamic acid.

The solution including the polyimide thus obtained may be used without change, or may be used in a manner in which a polymer may be precipitated using a solvent such as methanol or ethanol and then separated in powder form, or the resulting powder may be additionally dissolved in an appropriate solvent before use. The solvent for additional dissolution is not particularly limited, so long as it may dissolve the obtained polymer, and examples thereof may include m-cresol, 2-pyrrolidone, NMP, N-ethyl-2-pyrrolidone, N-vinyl-2-pyrrolidone, DMAc, DMF (dimethylformamide), and γ-butyrolactone.

In addition, the polyimide film of the present invention may be obtained in a manner in which the polyamic acid is cast on a support and then subjected to dehydration ring-closure as mentioned above. As such, the conversion rate (dehydration ring-closure rate) of polyamic acid into polyimide is defined as the imidization rate. The imidization rate of the polyimide according to the present invention is not limited to 100%, and may be any value selected from 1 to 100%, as necessary.

In the present invention, the polyimide film, which is formed through dehydration ring-closure, may be heat treated once more so as to remove heat hysteresis and residual stress from the film, thus ensuring high thermal stability to result in a high coefficient of thermal expansion. The film after heat treatment has a residual volatile content of 5% or less, and preferably 3% or less.

The thickness of the polyimide film thus manufactured is not particularly limited, but is preferably 10 to 250 μm, and more preferably 10 to 100 μm.

As mentioned above, the polyamic acid obtained by reacting the diamine and the acid dianhydride is imidized to give a polyimide and a polyimide film, and the polyimide film thus obtained may exhibit high solubility in an organic solvent such as N-methyl-2-pyrrolidone (NMP), dimethylacetamide (DMAc), dimethyl phthalate (DMP), or dimethylsulfoxide (DMSO), a transmittance of 80% or more at 550 nm for a film thickness of 10 to 100 µm, and a dielectric constant of 3.3 or less at 1 GHz.

As mentioned above, the polyimide film according to the present invention has a low dielectric constant and is colorless and transparent, and is thus useful for an electronic material such as a protective material or an insulating material in liquid crystal displays or semiconductors, an optical communication material such as an optical waveguide material, etc.

Mode for Invention

A better understanding of the present invention may be obtained through the following examples and comparative examples, and the following examples are set forth to illustrate but are not to be construed to limit the present invention.

Preparation Example 1

1-1: Synthesis of Compound Represented by Chemical Formula 2

14.5 g (125 mmol) of fumaric acid was mixed with 200 ml of methanol, added with 5 ml of conc. sulfuric acid and then refluxed at 100° C. for 1 hr. The refluxed product was cooled in a cooling bath and neutralized with 200 g of 10% sodium carbonate to give a white precipitate. The precipitate was filtered, washed with water, and dried in a vacuum oven at 50° C. for 12 hr, thus obtaining 16.6 g of the compound represented by Chemical Formula 2 (yield 92%). The synthesis of the compound represented by Chemical Formula 2 was performed using the method reported by Carr G. et al. (Carr G., Williams D. E., Díaz-Marrero A. R., Patrick B. O., Bottriell H., Balgi A. D., Donohue E., Roberge M., and Andersen R. J., *J. Nat. Prod.* 2010, 73, 422).

The melting point (Mp) (Buchi, M-560) of the compound represented by Chemical Formula 2 was measured to be 102° C., which is the same as the melting point of the compound prepared by the method reported by Carr G. et al.

1-2: Synthesis of Compound Represented by Chemical Formula 3

14.4 g (0.1 mol) of the compound represented by Chemical Formula 2 obtained in 1-1 above and 4.3 g (0.05 mol) of piperazine were added to 100 ml of 1,4-dioxane and then refluxed for 16 hr, after which the refluxed product was cooled, thus affording a precipitate. The filtration and concentration of the precipitate was repeated, followed by drying in a vacuum oven for 12 hr, yielding 15.3 g of the compound represented by Chemical Formula 3 as a colorless solid (yield 82%).

The compound represented by Chemical Formula 3 was measured for melting point (Buchi, M-560) and analyzed using NMR ($^1$H and $^{13}$C) (JEOL, JNM-LA400) and IR (AVATAR, 360 FT-IR).

Melting point: 158° C. (EtOAc)
$^1$H NMR (400 MHz, CDCl$_3$): δ 2.38-2.50 (m, 4H, Het-CH$_2$CH$_2$), 2.54-2.70 (m, 6H, β-CH$_2$, Het-CH$_2$CH$_2$), 2.81 (dd, J=16.0 and 9.2 Hz, 2H, β-CH$_2$), 3.64 (s, 6H, 2OCH$_3$), 3.68 (dd, 2H, overlapped signals, α-CH), 3.70 (s, 6H, 2OCH$_3$);
$^{13}$C NMR (100 MHz, CDCl$_3$): δ 171.7 and 170.9 (ester C), 63.4 (α-CH), 51.8 (OCH$_3$), 51.5 (OCH$_3$), 49.9 (Het-CH$_2$CH$_2$), 34.0 (β-CH$_2$); Anal. Calcd. for C$_{16}$H$_{26}$N$_2$O$_8$; C, 51.33; H, 7.00; N, 7.48%. Found: C, 51.19; H, 7.09; N, 7.53%.

IR (KBr, cm$^{-1}$): 1734 for νC=O.

1-3: Synthesis of Compound Represented by Chemical Formula 4

11.2 g (0.03 mol) of the compound represented by Chemical Formula 3 obtained in 1-2 above was placed in a 500 ml round-bottom flask and mixed with 120 ml (0.24 mol) of 2 N potassium hydroxide and 120 ml of methanol. The resulting mixture was heated to 60° C. and dissolved, and further heated at the same temperature for 3 hr. The mixture was added with conc. hydrochloric acid to adjust the pH thereof to 3.8, after which the mixture was stirred at room temperature for 30 min to produce a precipitate. The precipitate was filtered and then washed with water. The washed precipitate was dried in a vacuum oven for 24 hr and recrystallized from 2000 ml of a mixture of water and methanol at a ratio of 1:1, thus obtaining 8.7 g of the compound represented by Chemical Formula 4 (yield 92%). The obtained compound represented by Chemical Formula 4 was not dissolved in a typical organic solvent or in water; rather, to make an NMR sample, the compound represented by Chemical Formula 4 was mixed with heavy water (D$_2$O), in which solid potassium hydroxide was dissolved, and was then used for NMR analysis.

The compound represented by Chemical Formula 4 was measured for melting point (Buchi, M-560), and analyzed using NMR ($^1$H and $^{13}$C) (JEOL, JNM-LA400) and IR (AVATAR, 360 FT-IR).

Melting point: 218-219° C. (H$_2$O+MeOH)
$^1$H NMR (400 MHz, D$_2$O/KOH): δ 2.46-2.54 (bd, 4H, Het-CH$_2$CH$_2$), 2.56-3.40 (bm, 6H, β-CH$_2$, Het-CH$_2$CH$_2$), 3.44-3.54 (bm, 2H, β-CH$_2$), 4.80 (dd, 2H, overlapped signals, α-CH);
$^{13}$C NMR (100 MHz, D$_2$O/KOH): δ 178.8 (COOH), 67.7 (α-CH). 49.1 (Het-CH$_2$CH$_2$), 37.4 (β-CH$_2$); Anal. Calcd. for C$_{12}$H$_{18}$N$_2$O$_8$; C, 45.28; H, 5.70; N, 8.80%. Found: C, 45.16; H, 5.79; N, 8.83%.

IR (KBr, cm$^1$): 1723 for νC=O.

1-4: Synthesis of Aliphatic Anhydride Compound Represented by Chemical Formula 1

5.4 g (17 mmol) of the compound represented by Chemical Formula 4 obtained in 1-3 above, 3.18 g (35.7 mmol) of pyridine and 3.6 g (35.7 mmol) of acetic anhydride were placed in a 50 ml flask equipped with a condenser and a magnetic stirrer and then allowed to react at 60° C. for 24 hr. After completion of the reaction, the reaction product was cooled and filtered. The filtration product was washed with 200 ml of acetic anhydride and 200 ml of purified diethylether, dried in a vacuum oven at 40° C., and recrystallized from 100 ml of acetic anhydride, thus obtaining 2.9 g of the compound represented by Chemical Formula 1 (yield 60%).

The compound represented by Chemical Formula 1 was measured for melting point (Buchi, M-560) and analyzed using NMR ($^1$H and $^{13}$C) (JEOL, JNM-LA400) and IR (AVATAR, 360 FT-IR).

Melting point: 156° C. (decompose)
$^1$HNMR (400 MHz, d6-DMSO): δ 2.39 (bd, J=6.8 Hz, 4H, Het-CH$_2$CH$_2$), 2.76 (bd, J=6.8 Hz, 4H, Het-CH$_2$CH$_2$), 3.04 (d, J=8.4 Hz, 4H, β-CH$_2$), 4.21 (t, J=16.4 Hz, 2H, α-CH);

$^{13}$C NMR (100 MHz, d6-DMSO): δ 171.6 (COOCO), 170.6 (COOCO), 63.6 (α-CH), 48.9 (Het-CH$_2$CH$_2$), 31.9 (β-CH$_2$); Anal. Calcd. for C$_{12}$H$_{14}$N$_2$O$_6$; C, 51.06; H, 5.00; N, 9.93%. Found: C, 49.93; H, 5.10; N, 9.96%.

IR (KBr, cm$^{-1}$): 1860, 1781 (vC=O), 1210, 1127 (C—O—C).

Examples 1 to 4

In a 30 ml three-neck flask equipped with a mechanical stirrer, the acid dianhydride (2.0 mmol) of Preparation Example 1 and 4 ml of m-cresol were placed, and while nitrogen gas was allowed to slowly flow, the mixture was stirred until the acid dianhydride was completely dissolved. Each diamine (2.0 mmol) of Table 1 below and 2 ml of m-cresol were further added, and the flask was heated to 60° C. and stirred for 2 days. A portion of the polycondensed solution containing polyamic acid was cast on a glass plate, and the glass plate was heated in a vacuum at 80° C. for 3 hr, 200° C. for 1 hr and 250° C. for 1 hr, thus obtaining a polyimide film. After the curing process, in order to obtain a support-free flexible polyimide film, the glass plate was immersed in hot water, and the film was removed from the glass plate, thereby manufacturing a polyimide film 15 μm thick.

The polyimide film thus obtained was observed to have 1771 to 1775 cm$^{-1}$ absorption bands, which are inherent of imide, via FTIR (AVATAR 360 FT-IR) (FIG. 1). This is deemed to be due to the asymmetric stretching vibration of a carbonyl group, and 1691 to 1697 cm$^{-1}$ absorption bands are deemed to be due to the symmetric stretching vibration of a carbonyl group, and the non-conjugated structure of the imide carbonyl group due to the absence of an aromatic ring can be confirmed to cause the absorption shift in the aliphatic polyimide.

TABLE 1

|  | Ex. 1 | Ex. 2 | Ex. 3 | Ex. 4 |
|---|---|---|---|---|
| Kind of diamine | 1,6-hexamethylenediamine (16DAH) | 1,12-diaminododecane (112DAD) | 4,4'-diaminodicyclohexylmethane (MCA) | 4,4'-methylene bis (2-methylcyclohexylamine) (MMCA) |

TABLE 2

|  | Amount of first acid dianhydride (mmol) | Kind of second acid dianhydride | Amount of second acid dianhydride (mmol) |
|---|---|---|---|
| Ex. 5 | 90 | 6FDA | 10 |
| Ex. 6 | 70 | 6FDA | 30 |
| Ex. 7 | 50 | 6FDA | 50 |
| Ex. 8 | 90 | CBDA | 10 |
| Ex. 9 | 70 | CBDA | 30 |
| Ex. 10 | 50 | CBDA | 50 |
| Ex. 11 | 90 | CHDA | 10 |
| Ex. 12 | 70 | CHDA | 30 |
| Ex. 13 | 50 | CHDA | 50 |
| Ex. 14 | 90 | BTA | 10 |
| Ex. 15 | 70 | BTA | 30 |
| Ex. 16 | 50 | BTA | 50 |
| Ex. 17 | 90 | HBPDA | 10 |
| Ex. 18 | 70 | HBPDA | 30 |
| Ex. 19 | 50 | HBPDA | 50 |
| Ex. 20 | 90 | PMDA | 10 |
| Ex. 21 | 90 | BPDA | 10 |

Comparative Example 1

A polyimide film (thickness 15 μm) was manufactured in the same manner as in Example 1, with the exception that pyromellitic dianhydride (PMDA) was used as the acid dianhydride.

Comparative Example 2

A polyimide film (thickness 15 μm) was manufactured in the same manner as in Example 1, with the exception that pyromellitic dianhydride (PMDA) was used as the acid

Examples 5 to 21

In a 30 ml three-neck flask equipped with a mechanical stirrer, the first acid dianhydride of Preparation Example 1 and 4 ml of m-cresol were placed, and while nitrogen gas was allowed to slowly flow, the mixture was stirred until the first acid dianhydride was completely dissolved. The second acid dianhydride, shown in Table 2 below, was further added and completely dissolved. Thereafter, 4,4'-methylenebis(cyclohexylamine) (MCA) (100 mmol), as the diamine, and 2 ml of m-cresol were added, and the flask was heated to 60° C. and stirred for 2 days. A portion of the polycondensed solution containing polyamic acid was cast on a glass plate, and the glass plate was heated in a vacuum at 80° C. for 3 hr, 200° C. for 1 hr and 250° C. for 1 hr, thus obtaining a polyimide film. After the curing process, in order to obtain a support-free flexible polyimide film, the glass plate was immersed in hot water, and the film was removed from the glass plate, thereby manufacturing a polyimide film 15 μm thick.

dianhydride, 4,4'-oxydianiline (ODA) was used as the diamine, and N,N-dimethyl acetamide was used as the solvent.

<Evaluation of Properties>

The polyimide films of Examples and Comparative Examples were measured for molecular weight, optical properties, electrical properties, and thermal properties through the following methods. The results are shown in Table 3 below.

(1) Measurement of Molecular Weight and Polydispersity Index

The weight average molecular weight (Mw) and the number average molecular weight (Mn) were measured in terms of polystyrene by gel permeation chromatography (GPC) (Waters: Waters707). The polymer to be measured was dissolved to a concentration of 4000 ppm in tetrahydrofuran, and 100 μl thereof was placed in a GPC apparatus. The mobile phase for GPC was tetrahydrofuran, the flow rate thereof was set to 1.0 ml/min, and analysis was performed at 35° C. Four Waters HR-05, 1, 2, and 4E columns were connected in series. RI and PAD detectors were used at 35° C. Also, the polydispersity index (PDI) was determined by dividing the measured weight average molecular weight (Mw) by the number average molecular weight (Mn).

(2) Measurement of Light Transmittance

Transmittance was measured at 550 nm using a UV spectrophotometer (Konita Minolta, CM-3700d).

(3) Measurement of Dielectric Constant

The dielectric constant was measured using an E4980A precision LCR meter made by Agilent, and the upper plate was subjected to gold sputtering using a 2-probe process. Further, a frequency was 1 Mhz and A was 2 mm×2 mm, and the film thickness was different at respective points, and thus the thickness of each point was measured through alpha-step. For the lower plate, the capacitance of the intermediate film was measured using an ITO coating surface. The measured value and the capacitance were substituted into Equation 1 below, thus determining the dielectric constant.

$$K=(C \times d)/(A \times \in_0) \quad \text{[Equation 1]}$$

In Equation 1, K is the dielectric constant, C is the capacitance, d is the film thickness, A is the area (2×2 mm) of a sample (film), and $\in_0$ is the dielectric constant (8.85× $10^{-12}$ Fm$^{-1}$) in a vacuum.

(4) Measurement of Glass Transition Temperature (Tg)

The second run was performed from 50 to 300° C. at a heating rate of 10° C./min using a DSC7 made by Perkin Elmer, and the second value was determined to be the glass transition temperature (Tg).

TABLE 3

|  | Mn (×10⁴ g/mol) | PDI | Dielectric constant (ε) | Light transmittance (%, 550 nm) | Tg (° C.) |
|---|---|---|---|---|---|
| Ex. 1 | 2.19 | 1.6 | 2.67 | 83 | 186 |
| Ex. 2 | 2.23 | 1.8 | 2.14 | 86 | 192 |
| Ex. 3 | 3.2 | 2.3 | 3.30 | 84 | 220 |
| Ex. 4 | 2.9 | 2.3 | 2.87 | 85 | 225 |
| Ex. 5 | 3.3 | 2.1 | 2.98 | 84 | 230 |
| Ex. 6 | 6.2 | 2.4 | 3.05 | 84 | 235 |
| Ex. 7 | 10.3 | 2.3 | 3.13 | 85 | 247 |
| Ex. 8 | 4.9 | 2.4 | 2.94 | 84 | 231 |
| Ex. 9 | 9.3 | 2.0 | 3.02 | 84 | 238 |
| Ex. 10 | 12.8 | 1.9 | 3.08 | 84 | 255 |
| Ex. 11 | 4.1 | 2.7 | 2.90 | 84 | 235 |
| Ex. 12 | 8.6 | 2.4 | 2.94 | 85 | 241 |
| Ex. 13 | 11.4 | 2.6 | 2.98 | 85 | 262 |
| Ex. 14 | 3.0 | 2.5 | 3.02 | 84 | 225 |
| Ex. 15 | 2.8 | 2.4 | 3.16 | 83 | 239 |
| Ex. 16 | 3.1 | 2.2 | 3.30 | 83 | 246 |
| Ex. 17 | 4.2 | 2.0 | 2.91 | 84 | 223 |
| Ex. 18 | 10.1 | 2.3 | 2.99 | 84 | 239 |
| Ex. 19 | 13.6 | 2.1 | 3.07 | 84 | 245 |
| Ex. 20 | 5.6 | 2.5 | 3.29 | 82 | 250 |
| Ex. 21 | 4.9 | 2.4 | 3.26 | 82 | 247 |
| C. Ex. 1 | 4.2 | 2.2 | 3.8 | 74 | 287 |
| C. Ex. 2 | 25.7 | 1.9 | 4.0 | 68 | Not measured |

As is apparent from Table 3, the films of Examples 1 to 21 exhibited low dielectric constants and high transmittance compared to the films of Comparative Examples 1 and 2.

In Examples 5 to 21, the films resulting from adding the acid dianhydride (first acid dianhydride) of Preparation Example 1 with the acid dianhydride (second acid dianhydride) at a predetermined molar ratio maintained the transmittance and the dielectric constant equal to those of Examples 1 and 4 and increased the glass transition temperature by a significant amount.

All simple modifications or variations of the present invention may be easily performed by those skilled in the art, and may be incorporated in the scope of the present invention.

The invention claimed is:

1. A polyimide, obtained by polymerizing a diamine and an acid dianhydride to give a polyamic acid that is then imidized, wherein the acid dianhydride includes a compound represented by Chemical Formula 1 below:

<Chemical Formula 1>

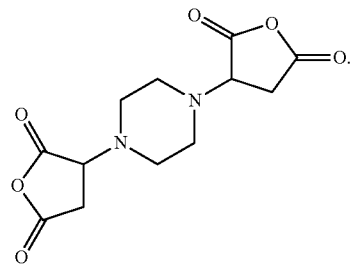

2. The polyimide of claim 1, wherein the diamine is at least one selected from the group consisting of an aromatic diamine selected from the group consisting of p-phenylenediamine, m-phenylenediamine, 2,5-diaminotoluene, 2,6-diaminotoluene, 1,3-bis(4,4'-aminophenoxy)benzene, 4,4'-diamino-1,5-phenoxypentane, 4,4'-diaminobiphenyl, 3,3'-dimethyl-4,4'-diaminobiphenyl, 3,3'-dimethoxy-4,4'-diaminobiphenyl, 4,4'-diaminodiphenylether, 4,4'-diaminodiphenylmethane, 2,2'-diaminodiphenylpropane, bis (3,5-diethyl-4-aminophenyl)methane, diaminodiphenylsulfone, diaminobenzophenone, diaminonaphthalene, 1,4-bis(4-aminophenoxy)benzene, 1,4-bis(4-aminophenyl)benzene, 9,10bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl] propane, 2,2'-trifluoromethyl-4,4'-diaminobiphenyl, and mixtures thereof; an alicyclic diamine selected from the group consisting of 1,4-diaminocyclohexane, 1,4-cyclohexanebis(methylamine), 4,4'-diaminodicyclohexylmethane (MCA), 4,4'-methylenebis(2-methylcyclohexylamine) (MMCA), and mixtures thereof; and an aliphatic diamine selected from the group consisting of ethylene diamine (EN), 1,3-diaminopropane (13DAP), tetramethylene diamine, 1,6-hexamethylene diamine (16DAH), 1,12-diaminododecane (112DAD), and mixtures thereof.

3. The polyimide of claim 1, wherein the diamine is at least one selected from the group consisting of 1,6-hexamethylene diamine (16DAH), 1,12-diaminododecane (112DAD), 4,4'-diaminodicyclohexylmethane (MCA), and 4,4'-methylenebis(2-methylcyclohexylamine) (MMCA).

4. The polyimide of claim 1, wherein the acid dianhydride further includes at least one selected from the group consisting of 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic dianhydride (TDA), pyromellitic dianhydride (1,2,4,5-benzene tetracarboxylic dianhydride, PMDA), benzophenone tetracarboxylic dianhydride (BTDA), biphenyl tetracarboxylic dianhydride (BPDA), oxydiphthalic dianhydride (ODPA), biscarboxyphenyl dimethyl silane dianhydride (SiDA), bisdicarboxyphenoxy diphenyl sulfide dianhydride (BDSDA), sulfonyl diphthalic anhydride (SO₂DPA), cyclobutane tetracarboxylic dianhydride (CBDA), isopropylidenediphenoxy bisphthalic anhydride (6HBDA), bicyclo[2.2.2]-7-octene-2,3,5,6-tetracarboxylic dianhydride (BTA), cyclopentane tetracarboxylic dianhydride (CPDA), cyclohexane tetracarboxylic dianhydride (CHDA), and bicyclohexane tetracarboxylic dianhydride (HBPDA).

5. A polyimide film comprising the polyimide of claim 1.

6. The polyimide film of claim 5, wherein the polyimide film has a transmittance of 80% or more at 550 nm for a film thickness of 10 to 100 μm, and a dielectric constant of 3.3 or less at 1 GHz.

7. A polyimide film comprising the polyimide of claim 2.

8. A polyimide film comprising the polyimide of claim 3.

9. A polyimide film comprising the polyimide of claim 4.

10. The polyimide film of claim 7, wherein the polyimide film has a transmittance of 80% or more at 550 nm for a film thickness of 10 to 100 μm, and a dielectric constant of 3.3 or less at 1 GHz.

11. The polyimide film of claim 8, wherein the polyimide film has a transmittance of 80% or more at 550 nm for a film thickness of 10 to 100 μm, and a dielectric constant of 3.3 or less at 1 GHz.

12. The polyimide film of claim 9, wherein the polyimide film has a transmittance of 80% or more at 550 nm for a film thickness of 10 to 100 μm, and a dielectric constant of 3.3 or less at 1 GHz.

\* \* \* \* \*